United States Patent [19]

Clay et al.

[11] 4,162,904

[45] Jul. 31, 1979

[54] SILENCER-SEPARATOR DEVICE

[75] Inventors: Paul E. Clay; James K. Floyd, both of Louisville, Ky.

[73] Assignee: American Air Filter Company, Inc., Louisville, Ky.

[21] Appl. No.: 895,146

[22] Filed: Apr. 10, 1978

[51] Int. Cl.² .................... B01D 50/00; F01N 3/02
[52] U.S. Cl. .................... 55/276; 55/319; 55/394; 55/426; 55/447; 55/462; 181/231; 181/257; 181/274
[58] Field of Search ............... 55/184, 199, 276, 319, 55/329, 337, 394, 414, 423, 426, 447, 462, 466, DIG. 21; 181/224, 231, 254, 256, 257, 269, 274, 280, 264, 255

[56] References Cited

U.S. PATENT DOCUMENTS

| | | | |
|---|---|---|---|
| 1,789,717 | 1/1931 | Walker | 55/423 |
| 2,039,115 | 4/1936 | Reif | 55/426 |
| 2,288,245 | 6/1942 | Kopp | 55/184 |
| 3,251,176 | 5/1966 | Gleason | 55/466 |
| 3,924,575 | 12/1975 | Zipay | 55/337 |

FOREIGN PATENT DOCUMENTS

| | | | |
|---|---|---|---|
| 1226798 | 2/1960 | France | 181/264 |
| 459878 | 10/1950 | Italy | 181/252 |

*Primary Examiner*—Frank W. Lutter
*Assistant Examiner*—David L. Lacey
*Attorney, Agent, or Firm*—Jon C. Winger

[57] ABSTRACT

A silencer-separator having a cylindrical casing of circular cross section which is divided into an upper separator chamber and a lower expansion chamber. An inlet pipe directs a gas stream into the expansion chamber, and a pair of angularly disposed tubes direct the gas upward through a divider into the separator chamber with a swirling motion along the interior wall surface. A tubular central outlet extends through the upper end closure and has an entrance a substantial vertical distance therebelow. A peripheral baffle adjacent the interior wall collects entrained particles in the separator section and the collected particles are drained through a tube that may lead to the bottom of the expansion chamber. A perforated cylindrical body filled with a noise-attenuating fibrous substance is coaxially supported within the central outlet.

10 Claims, 5 Drawing Figures

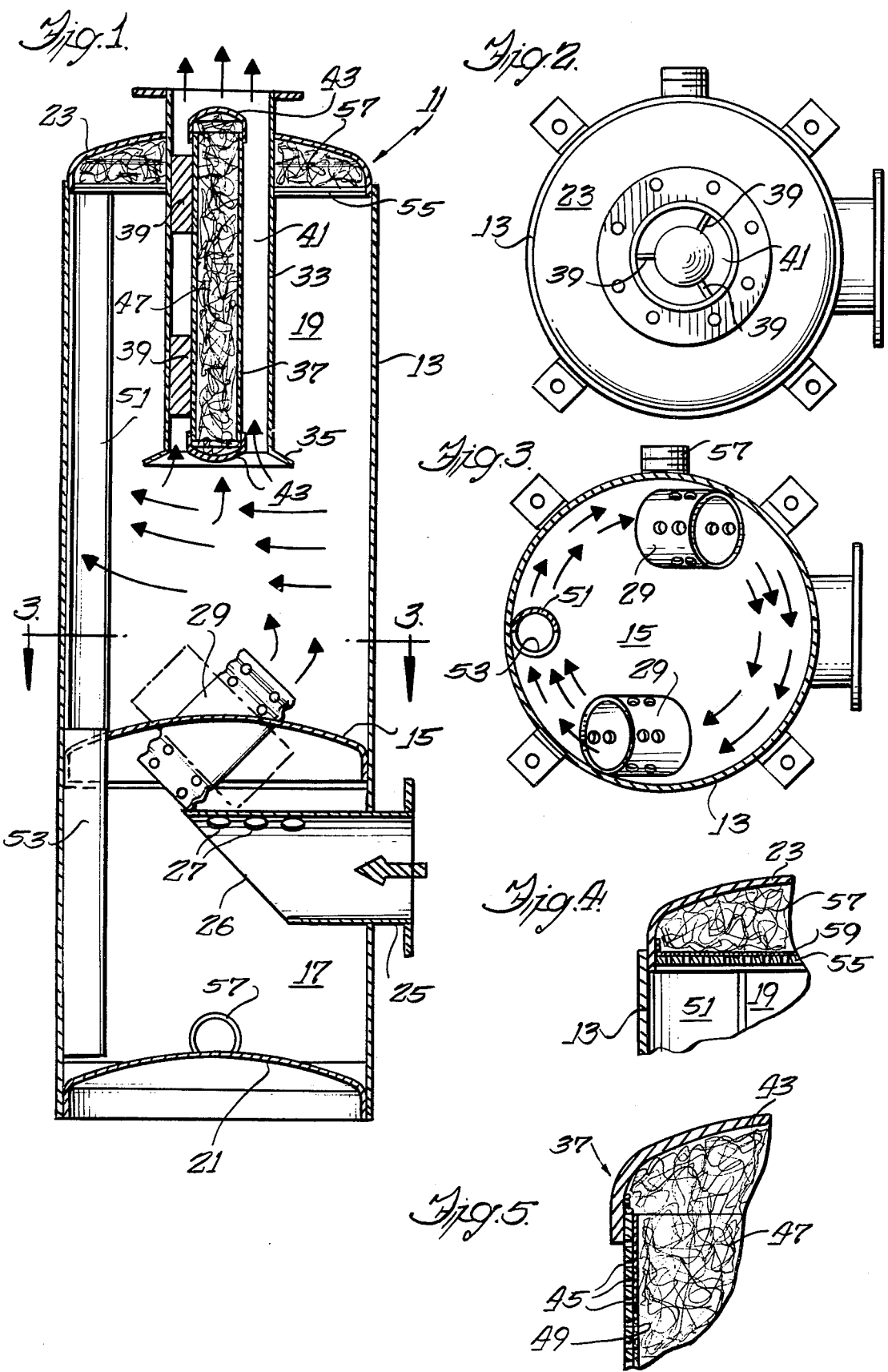

SILENCER-SEPARATOR DEVICE

BACKGROUND OF THE INVENTION

This invention relates generally to silencing devices for employment with a high velocity gas stream and more particularly to devices for silencing and for separating entrained liquid from a high velocity exhaust gas stream.

Various devices have been developed for attenuating or silencing the sound of high velocity fluid flow by decreasing the noise level to a reasonable decibel range. For example, such devices have been used on steam relief valves, steam and air vents, exhausts from steam turbines and the like. Examples of patents in this general area are U.S. Pat. No. 2,998,860, issued Sept. 5, 1961, and U.S. Pat. No. 3,454,129, issued July 8, 1969. Other patents such as U.S. Pat. No. 2,580,655, issued Jan. 1, 1952, show devices designed to both silence a stream of gas and remove entrained liquid or solid particles. Improved versions of such silencing and separating devices are constantly being sought after—particularly for treatment of high velocity gas streams carrying fair amounts of entrained liquid particles.

SUMMARY OF THE INVENTION

The present invention provides a silencer-separator device that not only significantly reduces the sound or decibel level of a high velocity exhaust gas stream, but also effectively removes entrained particles even at high flow rates therethrough. Briefly, the device provides an expansion chamber surmounted by a separator chamber. The incoming, high velocity gas stream both expands and changes direction in the expansion chamber, and it is then thereafter subjected to centrifugal force, as a result of a swirling motion which is created by the flow path which interconnects the two chambers. The entrained particles are forced outward along the wall of the separator chamber and are collected and skimmed from the fluid stream by a concave baffle. The collected particles fall by gravity through a pipe into the lower expansion chamber, join the moisture initially separated therein and drain through a suitable connection. The initial significant flow expansion and change of direction plus the design of the upper separator chamber also attenuates the noise by significantly reducing the decibel level.

The foregoing features and advantages of the invention will be evident from the following detaled description of the preferred embodiment particularly when read in conjunction with the appended drawings.

BRIEF DESCRIPTION OF THE DRAWINGS

FIG. 1 is a vertical section view of a silencing-separating device embodying various features of the invention;

FIG. 2 is a plan view looking down on the device of FIG. 1;

FIG. 3 is a horizontal sectional view taken generally along the line of 3—3 of FIG. 1;

FIG. 4 is an enlarged fragmentary view illustrating an upper corner of the device shown in FIG. 1; and, FIG. 5 is a further enlarged fragmentary view illustrating an upper corner of the central cylindrical body which appears in FIG. 1.

DETAILED DESCRIPTION OF THE PREFERRED EMBODIMENT

Shown in the drawings is a separator-silencer device 11 which is particularly designed for attachment to the discharge of a high-capacity vacuum pump, for example, one of a type designed for use in connection with a suction de-watering operation, such as that practiced in the paper industry. The device 11 significantly lowers the noise of the vacuum pump exhaust while also effectively separating water from the exhaust stream of air leaving the vacuum pump. Although the illustrated device is particularly designed to meet the requirements of such an application, it should be understood that the principles involved in its construction are fully applicable to other silencing-separating operations where a fluid stream is to be handled which contains minute liquid or solid particles.

The separator-silencer device 11 includes a cylindrical housing or casing 13 which is circular in cross section and which includes an internal divider 15 that divides the casing into a lower expansion chamber 17 and an upper separating chamber 19. The expansion chamber 17 is closed at its lower end by a bottom closure 21, and the separation chamber 19 is closed by an upper cap 23.

An inlet pipe 25 penetrates the casing 13 at a location in the upper half of the expansion chamber 17 and extends radially into the chamber terminating at about the center thereof. The inlet pipe 25 has a tapered end 26 to encourage entrained water droplets to separate and fall downward. Apertures 27 in the upper wall of the inlet pipe induce air flow upward therethrough, while entrained water droplets in the high-velocity, wet air stream tend to travel diametrically across the chamber 17 and impinge upon the opposite cylindrical wall.

Passage upward from the expansion chamber 17 to the separating chamber 19 is provided by a pair of angularly disposed flow tubes 29 which are supported by and penetrate through the divider 15. The centers of the openings through which the flow tubes pass are located on a diameter of the circular divider, and this diameter is perpendicular to the vertical plane containing the axis of inlet pipe 25. The flow tubes 29 have apertured walls and corrugated ends to nullify the possibility of undesirable acoustical effects because solid walled tubes have a tendency to produce an organ-pipe resonance in an undesirable frequency range. Thus, these apertures in the tubes 29 add acoustical resistance and contribute to the overall silencing effect of the device.

As best seen in FIG. 3, the flow tubes 29 are disposed near the periphery of the divider 15 and at generally diametrically opposite locations. They are also disposed at an angle between about 30° and 60° to the vertical, and preferably at about 45° as depicted in FIG. 1. This arrangement creates a centrifugal or swirling air flow pattern in the upper separator chamber 19 which causes the heavier entrained particles to be forced outward along the interior wall of the casing 13.

An air outlet tube 33 extends downward into the upper chamber 19 through the top cap 23. The outlet tube 33 is preferably circular in cross section and is disposed coaxially within the casing 13. The outlet tube 33 extends downward to about the vertical midpoint of the chamber 19 where it terminates in a downwardly tapered flange 35.

Coaxially within the air outlet tube 33 is a closed-ended cylindrical body 37 which is supported by lugs 39 extending radially outward at 120° intervals, as best seen in FIG. 2. The lugs 39 span the distance across an annular opening 41 that remains between the outer surface of the cylindrical body 37 and the interior wall surface of the outlet tube 33. The lugs 39 are appropriately affixed at both vertical edges as by welding. The cylindrical body 37 is closed at both ends by generally rounded caps 43 and has its entire side wall perforated with a desired hole pattern 45, as best seen in FIG. 5. The interior of the cylindrical body 37 is totally filled with a fibrous, acoustic-absorbing material 47, such as fiberglas, and a fine mesh screen 49 may be disposed adjacent the interior wall of the body to prevent escape of the fibrous material. To assure the device 11 has the desired overall flow characteristics, the cylindrical body 37 and the outlet tube 33 are sized so that the annular air exit opening 41 has a cross sectional area equal to between about 65 and about 85 percent of the cross sectional area of the wet air inlet pipe 25.

To separate liquid droplets or particles from the swirling flow pattern of air, a peripheral skimmer or collector 51 is disposed so that it extends vertically along the entire height of the separator chamber 19. The collector 51 presents a concave surface with respect to the direction of swirling air movement which, as shown by the arrows in FIG. 3, is clockwise, as viewed from above. The particles removed by the concave collector 51 gravitate downward, and a drainpipe 53 is provided which penetrates the divider 15 preferably at a location in vertical alignment with the collector. The drainpipe runs for substantially the vertical height of the expansion chamber 17 and terminates just above the bottom closure 21. Preferably, the drainpipe 53 and the collector 51 are integral, being made from a piece of pipe of appropriate length by simply cutting the upper end along the diameter and removing half of the upper portion. The remaining half, as best seen in FIG. 3, serves as a concave collector 51 disposed in the swirling path of the air stream at the periphery of the chamber 19.

The upper cap 23 is provided with a perforated annular plate 55, best seen in FIG. 4, which creates a hollow chamber that is also filled with a fibrous acoustical silencing material 57, such as Fiberglas. A fine mesh screen 59 may also be used to assist in retention of the fibrous material. Particularly, because of the location of the entrance to the air outlet tube 33 at about the midpoint of the separation chamber 19, some of the entrained liquid will be carried upward into the upper half of the separation chamber 19 where it will condense on the exterior wall of the outlet tube 33 and the underside of the perforated annular plate 55. This moisture which drips down the sidewall of the tube 33 is carried outward by the tapered flange so that it avoids recapture in the mainstream of the exit air flow leaving via the annular exit 41. This moisture falls onto the upper surface of the divider 15 and finds its way to the upper end of the drain tube 53 through which it flows downward together with the moisture being removed on the concave surface of the collector 51. Because the divider 15 is upwardly convex, moisture which collects thereon is routed to the periphery where the drain tube 53 is located.

All of the collected particles, which in the illustrated instance will be droplets of liquid, are carried downward past the inwardly flowing stream of wet air by the drain pipe 53 and are discharged at a location just above the bottom. Here, the liquid joins with liquid condensing on the wall of the expansion chamber 17, and all of the collected liquid leaves the device through a side drain outlet 57 which preferably has exterior threads for coupling to a suitable drain line.

As a result of the overall design, the upper separator chamber 19 combines physically with the flow tubes 29 to form a Helmholtz resonator which passes low frequency noises but attenuates above a selected frequency. The design characteristics are such that this selected frequency or cut-off frequency is well below the first significant frequency emitted by a vacuum pump. In the silencer-separator device 11, the sound waves react against one another and tend to attenuate one another. Line-of-sight travel through the device is prohibited, and the fibrous material in the packed cylindrical body 37 and in the hollow chamber in the upper cap 23 absorb high frequency sound, i.e., about 250 Hertz and above.

As a result, the overall device 11 not only acts as a very effective silencer to reduce the noise of a high capacity vacuum pump to below allowable levels, but it doubles as an extremely effective separator to remove entrained particles, solid or liquid, from a high velocity gas stream.

Although the invention has been described with respect to a particularly preferred embodiment, it should be understood that various changes and modifications as would be obvious to one having the ordinary skill in the art may be made without departing from the scope of the invention which is defined solely by the appended claims. Various features of the invention are set forth in the appended claims.

What is claimed is:

1. A silencer-separator device comprising:
   a generally cylindrical casing which is generally circular in cross section;
   means intermediate the ends of said casing dividing it into an upper separator chamber and a lower expansion chamber;
   means closing the bottom of said expansion chamber;
   an inlet pipe communicating with said expansion chamber for directing a gas stream thereinto;
   at least two flow tubes defining at least two passages through said dividing means, said flow tube means being disposed at an angle between about 30° and about 60° to the vertical and being located to direct the gas upward into said separator chamber with a swirling movement along the interior wall surface of said casing;
   means closing the upper end of said separator chamber;
   central outlet means which extends downward through said upper closure means and which is located generally along the axis of said casing, said outlet means being generally tubular in shape and having an entrance located a substantial vertical distance below said upper closure means;
   peripheral baffle means adjacent said interior wall surface of said separator which collects particles entrained in the gas stream; and,
   means disposed vertically below said peripheral baffle means for removing the collected particles from said upper chamber.

2. A device in accordance with claim 1 wherein said means intermediate the ends of said casing is shaped so as to be convex upward and supports said at least two angularly disposed flow tubes.

3. A device in accordance with claim 1 wherein said removing means defines a drain pipe which extends downward through said means intermediate the ends of said casing and into said expansion chamber and which is located in generally vertical alignment with said peripheral baffle means.

4. A device in accordance with claim 3 wherein said peripheral baffle means is integral with said drain pipe and defines an elongated concave surface toward the swirling movement of gas in the separator section.

5. A device in accordance with claim 4 wherein said drain pipe terminates just short of the bottom of said expansion chamber and a drain opening is provided near the bottom of said expansion chamber.

6. A device in accordance with claim 5 wherein said inlet pipe enters radially through said casing and has a discharge end that is tapered downward.

7. A device in accordance with claim 6 wherein the axis of said inlet pipe lies in a vertical plane that is generally perpendicular to a line joining the center of the at least two passages through said dividing means.

8. A device in accordance with claim 1 further including a cylindrical body and support means supporting said cylindrical body generally coaxially within said central outlet means and forms an annular exit opening, said body being formed with a perforated cylindrical wall and being filled with a noise-attenuating fibrous substance.

9. A device in accordance with claim 8 wherein said annular exit opening between said cylindrical body and said outlet means has a cross sectional area equal to between about 65 and about 85 percent of the cross sectional area of said inlet pipe.

10. A device in accordance with claim 9 wherein said upper closure includes a hollow chamber formed with a perforated lower wall which chamber is filled with a fibrous noise-attenuating substance.

* * * * *